Dec. 4, 1945.  A. W. ENGBERG  2,390,431
PISTON SKIRT EXPANDER
Filed Aug. 4, 1944

A. W. Engberg
INVENTOR.

BY Knowles.
ATTORNEYS.

Patented Dec. 4, 1945

2,390,431

UNITED STATES PATENT OFFICE 2,390,431

PISTON SKIRT EXPANDER

Arthur W. Engberg, Madison, Wis.

Application August 4, 1944, Serial No. 548,005

2 Claims. (Cl. 309—12)

This invention relates to a device designed for use in expanding the skirt of a piston, to insure a close fit between the skirt of the piston and rebored cylinder in which the piston works.

An important object of the invention is to provide a device of this character which may be readily and easily positioned, eliminating the necessity of making alterations in the piston construction other than alterations that fall within the skill of the usual mechanic, in order to operate the device.

With the foregoing and other objects in view which will appear as the description proceeds, the invention consists of certain novel steps in the method and certain details of construction and combinations of parts hereinafter more fully described and pointed out in the claims, it being understood that changes may be made in the method disclosed and in the construction and arrangement of parts without departing from the spirit of the invention as claimed.

Referring to the drawing.

Figure 1:
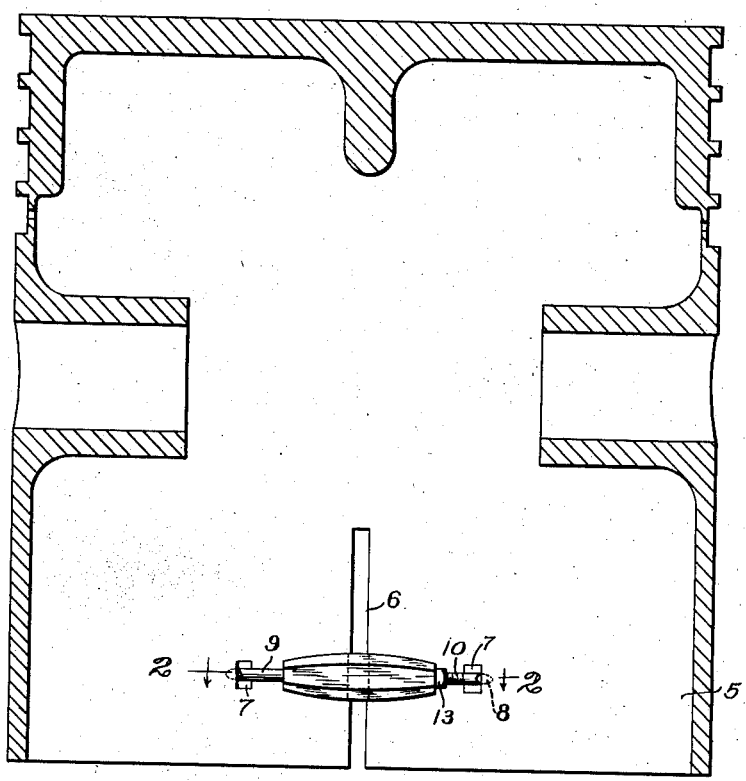
Figure 1 is a longitudinal sectional view through a piston, illustrating the expanding device, forming the essence of the present invention, as positioned relative to the piston skirt.
Figure 2:
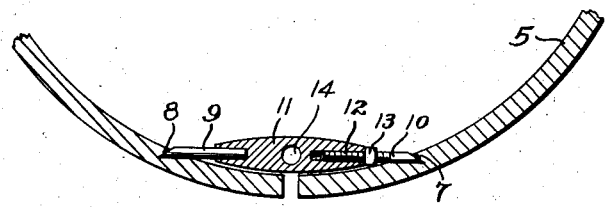
Figure 2 is a sectional view taken on line 2—2, Figure 1.

Referring to the drawing:

A piston to be repaired is indicated by the reference character 5, and when using the device to expand the skirt of a piston to increase the diameter thereof, the skirt is first formed with a cutout portion indicated in the present drawing by the reference character 6, the cutout portion extending inwardly from the edge of the skirt.

Notches indicated as 7 are then formed in the inner surface of the skirt, at points on opposite sides of the cutaway portion 6.

These notches 7 are designed to receive the tapered ends 8 of the rods 9 and 10 which are shown as having one of their respective ends positioned in a bore at one end of the turnbuckle 11. A bore in one end of the turnbuckle is threaded to accommodate the threaded end 12 of the pin 10, so that when the turnbuckle is located, the portions of the piston skirt opposite to the cutaway portions 7 thereof, will be forced laterally away from each other.

A nut indicated as 13 is positioned on the threaded portion of the pin 10, and bears against one end of the turnbuckle 11, securing the turnbuckle in its adjusted position against accidental movement caused by the vibrations of the engine of which the piston forms a part.

The turnbuckle 11 may be rotated by inserting a pin in the opening 14 disposed intermediate the ends of the turnbuckle.

From the foregoing it will be seen that due to the construction of the expanding device, a piston skirt may be expanded to closely fit the wall of the cylinder in which it moves, after the cylinder has been rebored and the piston supplied with sealing rings of a slightly larger diameter. The close fit of the skirt of the piston will insure against "piston slap" caused by the skirt of the piston, which is usually smaller in diameter than the cylinder bore after reboring a cylinder, striking the wall of the cylinder with an explosion within the cylinder.

What is claimed:

1. An expanding device for use in expanding the split skirt of a piston, comprising a turnbuckle having bores extending inwardly from the ends thereof, one of said bores being formed with screw threads, a threaded pin disposed within the threaded bore, a pin loosely mounted within the bore at the opposite end of the turnbuckle, said pins having sharpened outer ends adapted to bite into the metal of which the piston is constructed, at opposite sides of the split formed in the skirt thereof, whereby the skirt is expanded when the turnbuckle is rotated in one direction.

2. An expanding device for use in expanding the split skirt of a piston, comprising a turnbuckle having bores extending inwardly from the ends thereof, one of the bores being threaded, a threaded pin operating in the threaded bore, a pin positioned in the bore at the opposite end of the turnbuckle, the outer ends of the pins being tapered, the piston skirt having openings in opposite sides of the split portion thereof, the tapered ends of the pins being fitted within said openings, and said turnbuckle adapted to be rotated, moving the pins away from each other and expanding the skirt.

ARTHUR W. ENGBERG.